US012634423B2

(12) United States Patent
Park et al.

(10) Patent No.: US 12,634,423 B2
(45) Date of Patent: May 19, 2026

(54) SYSTEM FOR EVALUATING DISPLAY DEVICE AND METHOD FOR EVALUATING DISPLAY DEVICE USING THE SAME

(71) Applicant: Samsung Display Co., LTD., Yongin-si (KR)

(72) Inventors: Young Min Park, Yongin-si (KR); A Ree Song, Yongin-si (KR); Jae Joong Kwon, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 18/885,993

(22) Filed: Sep. 16, 2024

(65) Prior Publication Data

US 2025/0119518 A1 Apr. 10, 2025

(30) Foreign Application Priority Data

Oct. 10, 2023 (KR) ........................ 10-2023-0134658

(51) Int. Cl.
*H04N 13/125* (2018.01)
*H04N 13/383* (2018.01)
*H04N 13/305* (2018.01)

(52) U.S. Cl.
CPC ......... *H04N 13/125* (2018.05); *H04N 13/383* (2018.05); *H04N 13/305* (2018.05)

(58) Field of Classification Search
CPC .. H04N 13/125; H04N 13/383; H04N 13/305; H04N 13/327; H04N 13/351; H04N 17/004
See application file for complete search history.

(56) References Cited

U.S. PATENT DOCUMENTS

| | | | |
|---|---|---|---|
| 9,304,387 B2 | 4/2016 | Park et al. | |
| 2007/0058044 A1* | 3/2007 | Pedeville | H04N 17/04 |
| | | | 348/E17.005 |
| 2012/0105604 A1* | 5/2012 | Lim | H04N 17/04 |
| | | | 348/51 |
| 2013/0120366 A1* | 5/2013 | Lee | H04N 13/305 |
| | | | 345/419 |
| 2013/0265508 A1* | 10/2013 | Kim | G02F 1/13471 |
| | | | 349/182 |
| 2014/0267388 A1* | 9/2014 | Smyth | B60K 35/29 |
| | | | 345/173 |
| 2015/0015681 A1* | 1/2015 | Kim | G02B 30/27 |
| | | | 348/51 |
| 2015/0198815 A1* | 7/2015 | Orimoto | H04N 13/282 |
| | | | 358/1.18 |

(Continued)

FOREIGN PATENT DOCUMENTS

| | | |
|---|---|---|
| KR | 10-1524680 | 6/2015 |
| KR | 10-1836180 | 3/2018 |

*Primary Examiner* — Ibrahim A Khan
(74) *Attorney, Agent, or Firm* — F. CHAU & ASSOCIATES, LLC

(57) ABSTRACT

A system for evaluating a display device includes a display device including a display panel outputting images for a plurality of viewpoints and a lens array refracting the images; and a viewing angle meter disposed on a measuring point of the display device and extracting a viewing angle for each of the plurality of viewpoints. The viewing angle meter determines an optimal viewing coordinates of refracted images corresponding to each of the plurality of viewpoints based on the viewing angle.

18 Claims, 12 Drawing Sheets

VA: VA1, VA2, VA3
OVP: OVP1, OVP2, OVP3, OVP4

(56)　　　　　　　References Cited

U.S. PATENT DOCUMENTS

2016/0073097 A1 *　3/2016　Hamagishi ........... H04N 13/383
　　　　　　　　　　　　　　　　　348/59
2016/0198148 A1 *　7/2016　Asai .................... H04N 13/305
　　　　　　　　　　　　　　　　　348/59
2016/0219260 A1 *　7/2016　Sato ..................... H04N 13/305
2020/0150333 A1 *　5/2020　Vasylyev ............. G02B 6/0065
2021/0072598 A1 *　3/2021　Walker ................. G02B 5/0278
2021/0232004 A1 *　7/2021　Aspell .................. G02B 5/0231
2024/0111186 A1 *　4/2024　Walker ................ G02F 1/13362
2024/0121369 A1 *　4/2024　Gao ..................... H04N 13/117
2024/0214550 A1 *　6/2024　Park ..................... H04N 13/327

* cited by examiner

Voxel(3D pixel)

LSA: LS1, LS2, ..., LSm

<Viewing Angle Profile>

VA: VA1, VA2, VA3
OVP: OVP1, OVP2, OVP3, OVP4

FIG. 8

VWL_3

VWR_3

VWL_2

VWR_2

VWL_1

VWR_1

DR3

100'

DR1

DR2

MP'

VWL: VWL_1, VWL_2, VWL_3
VWR: VWR_1, VWR_2, VWR_3

<Luminance Profile>

<Crosstalk Profile>

MCA: MCA_L, MCA_R

Start

Outputting Images for Plurality of Viewpoints Through Display Panel — S1210

Capturing Images Refracted by Lens Array at Measuring Point — S1220

Extracting Viewing Angle of Each of Viewpoints at Measuring Point — S1230

Determining Optimal Viewing Coordinates of Refracted Images corresponding to Each of Viewpoints Based on Viewing Angle — S1240

End

SYSTEM FOR EVALUATING DISPLAY DEVICE AND METHOD FOR EVALUATING DISPLAY DEVICE USING THE SAME

CROSS-REFERENCE TO RELATED APPLICATION(S)

The application claims priority to and the benefits of Korean Patent Application No. 10-2023-0134658 under 35 U.S.C. § 119, filed on Oct. 10, 2023, in the Korean Intellectual Property Office (KIPO), the entire contents of which are incorporated herein by reference.

BACKGROUND

1. Technical Field

The disclosure relates to a system for evaluating a display device and a method for evaluating a display device using the same.

2. Description of the Related Art

As information technology develops, the importance of a display device as a connection medium between a user and information is being emphasized. In response to this, the use of display devices such as a liquid crystal display device and an organic light emitting display device is increasing.

A stereoscopic image display device is a display device that stimulates the viewer's visual senses like a real object and provides physical factors to perceive an image in three dimensions. For example, the stereoscopic image display device may provide different images to the left and right eyes of a viewer so that the viewer can view a stereoscopic image due to binocular parallax between the left and right eyes.

Recently, studies on an autostereoscopic method in which stereoscopic glasses are not worn have been actively conducted. The autostereoscopic method may include a lenticular method for separating left and right eye images using a cylindrical lens array, a barrier method for separating left and right eye images using a barrier, and the like.

An autostereoscopic display device may form a light field composed of multiple viewpoints. In case that a viewer does not view an image on the display device at an optimal viewing distance, distortion may be generated in the stereoscopic image.

The above description is only for helping the understanding of the background art for the technical ideas of the disclosure. Therefore, it should not be understood as the contents corresponding to the prior art known to those skilled in the art to which the disclosure pertains.

SUMMARY

A technical problem to be solved by the disclosure is to provide a system for evaluating a display device that can evaluate a display device that outputs an image corresponding to a plurality of viewpoints with improved reliability, and a method for evaluating a display device using the same.

An aspect of the disclosure relates to a system for evaluating a display device. A system for evaluating a display device according to embodiments of the disclosure may include a display device including a display panel outputting images for a plurality of viewpoints and a lens array refracting the images, and a viewing angle meter disposed on a measuring point of the display device and extracting a viewing angle for each of the plurality of viewpoints. The viewing angle meter may determine an optimal viewing coordinates of refracted images corresponding to each of the plurality of viewpoints based on the viewing angle.

The measuring point may include a first measuring point and a second measuring point arranged in a first direction, the viewing angle meter may determine a point where virtual lines extending along viewing angles of a corresponding one of the plurality of viewpoints extracted from the first and second measuring points meet as the optimal viewing coordinates.

The viewing angle meter may determine a distance between a virtual line passing through a point of the display device and the optimal viewing coordinates in the first direction.

The viewing angle meter may determine a distance between the measuring point and the optimal viewing coordinates in a second direction intersecting the first direction.

The viewing angle meter may generate a viewing angle profile for each of the plurality of viewpoints at the measuring point, and extract a maximum luminance angle of the viewing angle profile as a main viewing angle for each of the plurality of viewpoints.

The system for evaluating a display device may further include a moving member moving the viewing angle meter in a direction parallel to a plane which the display device extends.

The plurality of viewpoints may include a first viewpoint group and a second viewpoint group. Among the refracted images, images corresponding to the first viewpoint group may be visually recognized by a left eye of a user of the display device, and images corresponding to the second viewpoint group may be visually recognized by a right eye of the user.

The viewing angle meter may measure crosstalk of the images corresponding to the first viewpoint group and the images corresponding to the second viewpoint group.

The viewing angle meter may generate luminance profiles of the first viewpoint group and the second viewpoint group, and measure the crosstalk based on a ratio of luminance of the first viewpoint group and luminance of the second viewpoint group.

The crosstalk of the images corresponding to the first viewpoint group may decrease as the luminance of the second viewpoint group decreases.

Another aspect of the disclosure relates to a method for evaluating a display device. A method for evaluating a display device including a display panel outputting images for a plurality of viewpoints and a lens array refracting the images may include outputting the images through the display panel, capturing the images refracted by the lens array at a measuring point, extracting a viewing angle for each of the plurality of viewpoints at the measuring point, and determining an optimal viewing coordinates of refracted images corresponding to each of the plurality of viewpoints based on the viewing angle.

The measuring point may include a first measuring point and a second measuring point arranged in a first direction, and a point where virtual lines extending along viewing angles of a corresponding one of the plurality of viewpoints extracted from the first and second measuring points meet may be determined as the optimal viewing coordinates.

The optimal viewing coordinates may be determined based on a distance between a virtual line passing through a point of the display device and the optimal view coordinates in the first direction.

The optimal viewing coordinates may be determined based on a distance between the display device and the optimal viewing coordinates in a second direction intersecting the first direction.

The extracting of the viewing angle for each of the plurality of viewpoints at the measuring point may include generating a viewing angle profile for each of the plurality of viewpoints at the measuring point; and extracting a maximum luminance angle of the viewing angle profile as a main viewing angle for each of the plurality of viewpoints.

The plurality of viewpoints may include a first viewpoint group and a second viewpoint group. Among the refracted images, images corresponding to the first viewpoint group may be visually recognized by a left eye of a user of the display device, and images corresponding to the second viewpoint group may be visually recognized by a right eye of the user.

The method for evaluating a display device may further include measuring crosstalk of the images corresponding to the first viewpoint group and the images corresponding to the second viewpoint group.

The measuring of the crosstalk of the images may include generating luminance profiles of the first viewpoint group and the second viewpoint group; and measuring the crosstalk based on a ratio of luminance of the first viewpoint group and luminance of the second viewpoint group.

The crosstalk of the images corresponding to the first viewpoint group may decrease as the luminance of the second viewpoint group decreases.

BRIEF DESCRIPTION OF THE DRAWINGS

The accompanying drawings, which are included to provide a further understanding of the disclosure, and are incorporated in and constitute a part of this specification, illustrate embodiments of the disclosure, and, together with the description, serve to explain principles of the disclosure.

FIG. 8 is a schematic diagram illustrating an embodiment of the display device that outputs a multi-view image at a measuring point.

DETAILED DESCRIPTION OF THE EMBODIMENTS

Figure 1:
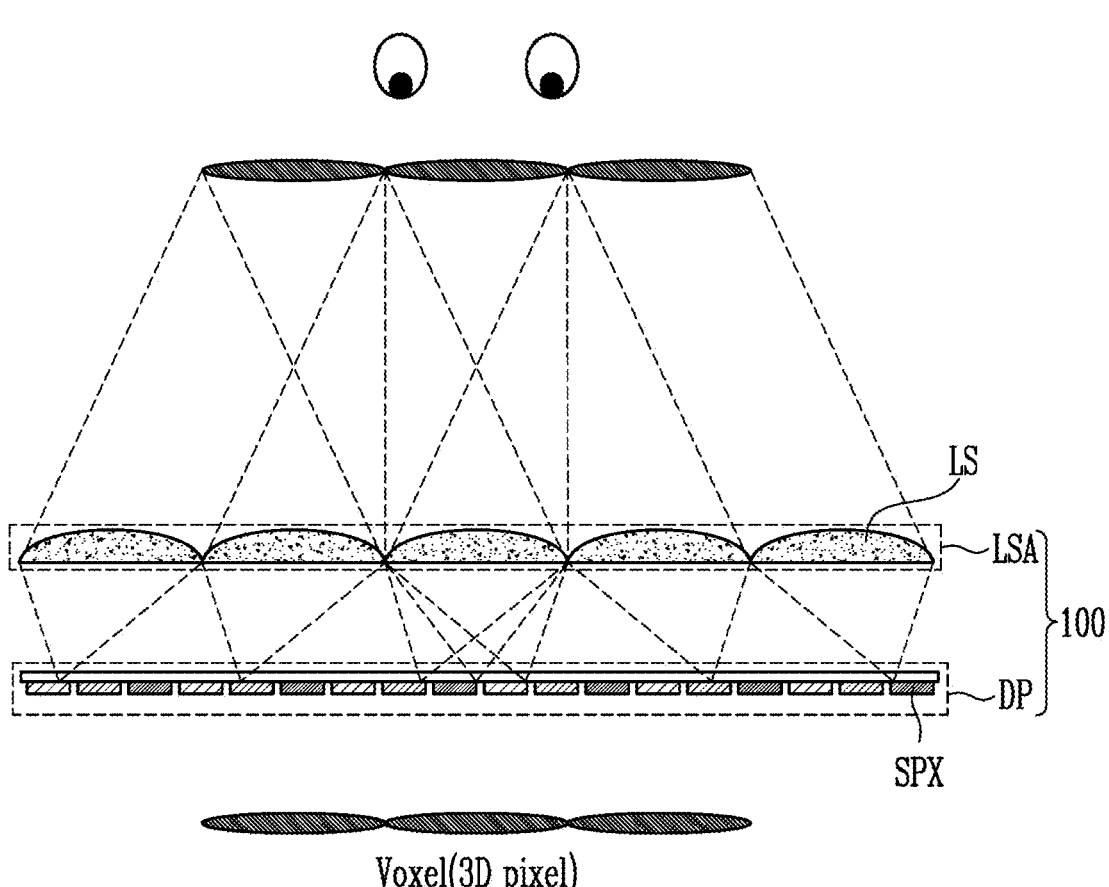
FIG. 1 is a schematic diagram for explaining a lens array type stereoscopic image display device.

Hereinafter, embodiments according to the disclosure are described in detail with reference to the accompanying drawings. It should be noted that in the following description, only portions necessary for understanding an operation according to the disclosure are described, and descriptions of other portions are omitted in order not to obscure the subject matter of the disclosure. The disclosure may be embodied in other forms without being limited to the embodiment described herein. However, the embodiment described herein is provided to describe in detail enough to readily implement the technical spirit of the disclosure to those skilled in the art to which the disclosure belongs.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Terms used herein are for describing specific embodiments and are not intended to limit the disclosure. Throughout the specification, in a case where a certain portion "includes", the case means that the portion may further include another component without excluding another component unless otherwise stated. "At least any one of X, Y, and Z" and "at least any one selected from a group consisting of X, Y, and Z" may be interpreted as one X, one Y, one Z, or any combination of two or more of X, Y, and Z (for example, XYZ, XYY, YZ, and ZZ). Here, "and/or" includes all combinations of one or more of corresponding configurations.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms such as "under", "on", and the like may be used for descriptive purposes, thereby describing a relationship between one element or feature and another element(s) or feature(s) as shown in the drawings. Spatially relative terms are intended to include other directions in use, in operation, and/or in manufacturing, in addition to the direction depicted in the drawings. For example, when a device shown in the drawing is turned upside down, elements depicted as being positioned "under" other elements or features are positioned in a direction "on" the other elements or features. Therefore, in an embodiment, the term "under" may include both directions of on and under. The device may face in other directions (for example, rotated 90 degrees or in other directions) and thus the spatially relative terms used herein are interpreted according thereto.

Various embodiments are described with reference to drawings schematically illustrating ideal embodiments. Accordingly, it will be expected that shapes may vary, for example, according to tolerances and/or manufacturing techniques. Therefore, the embodiments disclosed herein cannot be construed as being limited to shown specific shapes, and should be interpreted as including, for example, changes in shapes that occur as a result of manufacturing. As described above, the shapes shown in the drawings may not show actual shapes of areas of a device, and the disclosure is not limited thereto.

Unless otherwise defined or implied herein, all terms (including technical and scientific terms) used have the same meaning as commonly understood by those skilled in the art to which this disclosure pertains. It will be further understood that terms, such as those defined in commonly used dictionaries, should be interpreted as having a meaning that is consistent with their meaning in the context of the relevant art and should not be interpreted in an ideal or excessively formal sense unless clearly defined in the specification.

FIG. 1 is a schematic diagram for explaining a lens array type stereoscopic image display device.

Referring to FIG. 1, a display device 100 may include a display panel DP and a lens array LSA.

The display panel DP may include sub-pixels SPX that emit light to display an image. In an embodiment, each of the sub-pixels SPX may output one of light of a first color (for example, red), light of a second color (for example, green), and light of a third color (for example, blue). However, the color of light emitted from the sub-pixels SPX is not limited thereto. Light of various colors for realizing full-color may be output. The display panel DP may include an organic light emitting display panel, a liquid crystal display panel, a quantum dot display panel, or the like.

The lens array LSA may be disposed on the display panel DP and may include lenses LS that refract light incident from the sub-pixels SPX. For example, the lens array LSA may be implemented as a lenticular lens array, a micro lens array, or the like.

A light field display may be a 3D display device that implements a stereoscopic image by forming a light field expressed as a vector distribution (intensity, direction) of light in space using a flat panel display and an optical element (for example, the lens array LSA). The light field display may implement a more natural stereoscopic image because a viewer can see the depth and sides of an object, and may be a display technology that can be used in various ways through convergence with AR (Augmented Reality) technology, etc.

The light field may be implemented in several methods. For example, the light field may be formed by a method of forming light fields in multiple directions using multiple projectors, a method of controlling the direction of light using a diffraction grating, a method of adjusting the direction and intensity (luminance) of light according to the combination of each pixel using two or more panels, a method for controlling the direction of light using a pinhole or barrier, a method for controlling the direction in which light is refracted through a lens array, or the like.

In an embodiment, as shown in FIG. 1, the lens array type stereoscopic image display device 100 may display a stereoscopic image (3D image) by forming the light field.

A series of sub-pixels SPX may be assigned to each lens LS. Light emitted from each of the sub-pixels SPX may be refracted by the lens LS and proceed only in a specific direction to form the light field by light intensity and direction. In case that a viewer looks at the display device

100 in the light field formed as described above, the viewer may feel a three-dimensional effect of a corresponding image.

Image information according to the viewpoint of the viewer in the light field may be defined and processed in units of voxels. A voxel may be graphic information defining a point (or pixel) in a 3D space.

The resolution of a 2D image may be determined by the number of pixels (for example, density) in the same area. For example, in case that the number of pixels increases in the same area, the resolution may increase. For example, the display panel DP having a high pixel density may be required for a high-resolution image. Similarly, in case that the number of voxels at the same viewpoint through the lens array LSA increases, the resolution of a stereoscopic image may increase.

The display panel DP may be applied to electronic devices such as a smartphone, television, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, or a wearable device.

According to an embodiment, the display panel DP may be applied to a head mounted display device. Devices to which the display panel DP is applied are not limited to the embodiments described above, and the display panel DP may also be applied to an electronic device having a display screen on at least one side.

Figure 2:
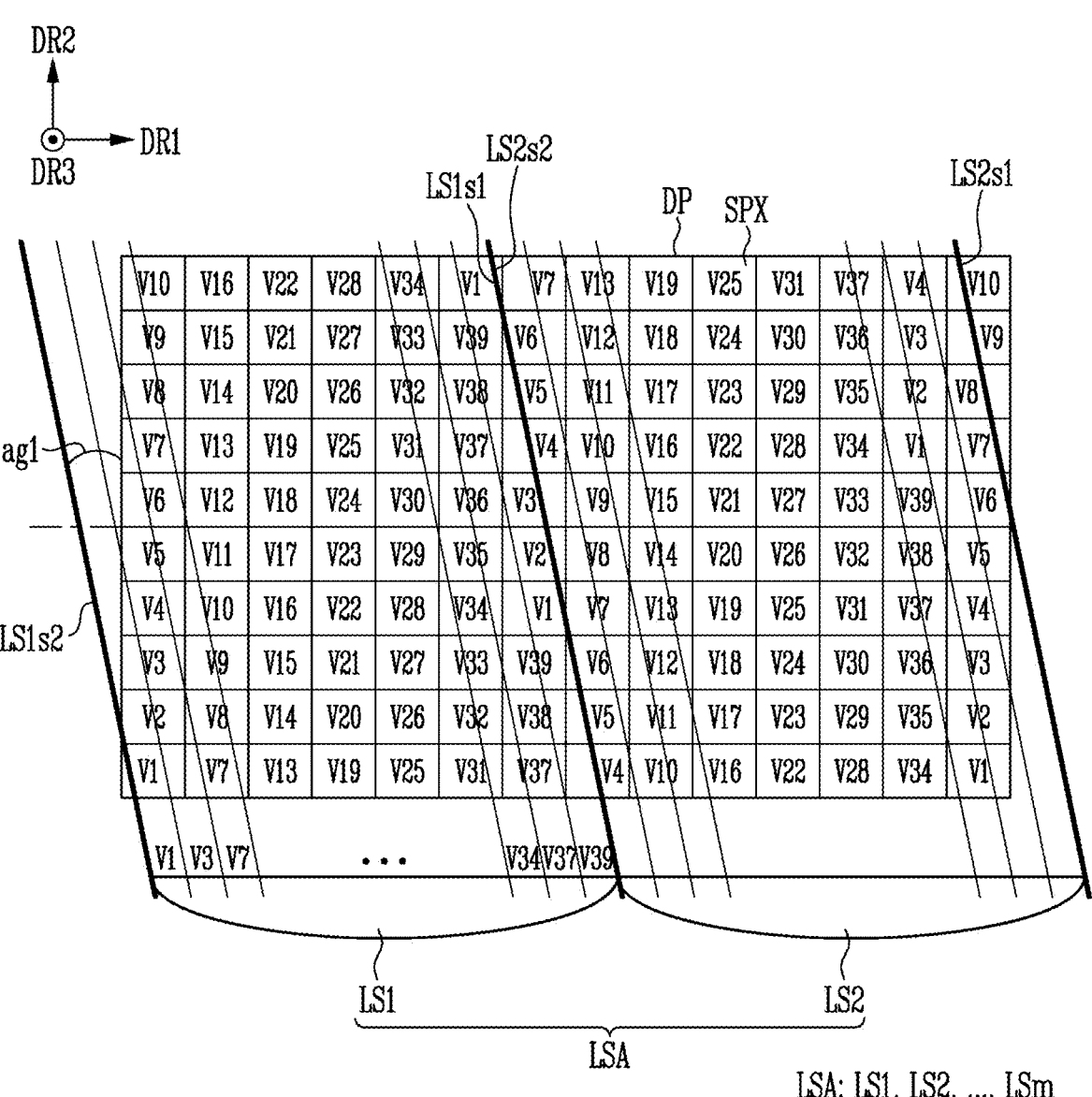
FIG. 2 is a schematic diagram for explaining the relationship between a lens array and a display panel.

FIG. 2 is a schematic diagram for explaining the relationship between a lens array and a display panel.

Referring to FIG. 2, the display panel DP may include sub-pixels SPX arranged in a first direction DR1 and a second direction DR2 intersecting the first direction DR1. The sub-pixels SPX may include light emitting surfaces in a third direction DR3 intersecting the first and second directions DR1 and DR2.

Each of the sub-pixels SPX may include a light emitting element configured to emit light. The light emitting element may be provided in various forms. For example, the light emitting element may be an inorganic light emitting element including an inorganic material. According to an embodiment, the light emitting element may be an organic light emitting diode (OLED).

Each of the sub-pixels SPX may be a first pixel R configured to emit red light, a second pixel G configured to emit green light, or a third pixel B configured to emit blue light.

The lens array LSA may include lenses LS1, LS2, . . . , and LSm, where m may be a natural number. The lenses LS1 to LSm may be lenticular lenses.

The lenses LS1 to LSm may overlap the sub-pixels SPX in the third direction DR3. The lenses LS1 to LSm may be arranged such that their long sides have an angle ag1 greater than 0 degrees with respect to the second direction DR2. For example, a first lens LS1 may include a first long side LS1s1 and a second long side LS1s2 that are parallel to each other. Also, a second lens LS2 may include a first long side LS2s1 and a second long side LS2s2 that are parallel to each other. The lenses LS1 to LSm may be arranged in the first direction DR1. However, the disclosure is not limited thereto, and in an embodiment, the angle ag1 may be 0 degrees.

A lower surface (a surface facing the sub-pixels SPX) of each of the lenses LS1 to LSm may be divided into multiple viewpoint areas V1 to V39. The viewpoint areas V1 to V39 may not be physically divided, but may be virtual areas, and may be defined in various ways according to the resolution of the display panel DP, the specifications of the lenses LS1 to LSm, the number of viewpoints to be provided to a user, and the like. Each of the lenses LS1 to LSm may distribute images corresponding to each of the viewpoint areas V1 to V39 in different directions (different viewpoints), so that the user may visually recognize a multi-view image in which images varies depending on the location.

The sub-pixels SPX may overlap one or more of the viewpoint areas V1 to V39 in the third direction DR3. FIG. 2 schematically shows major viewpoint areas V1 to V39 corresponding to the sub-pixels SPX. Sub-pixels SPX corresponding to the same viewpoint area may display an image for the same viewpoint. Accordingly, as shown in FIG. 2, in case that there are 39 viewpoint areas V1 to V39, the display panel DP may display 39 images simultaneously.

According to an embodiment, the display device 100 may display a stereoscopic image by displaying a right-eye image using sub-pixels SPX overlapping viewpoint areas V1 to V20 and displaying a right-eye image using sub-pixels SPX overlapping viewpoint areas V21 to V39 in the third direction DR3. A user of the display device 100 may be positioned so that the left-eye image is visually recognized by the left eye and the right-eye image is visually recognized by the right eye.

The sub-pixels SPX may be arranged in various structures such as RGB stripe, Diamond PENTILE™, S-stripe, Real RGB, normal PENTILE™, and the like.

Figure 3:
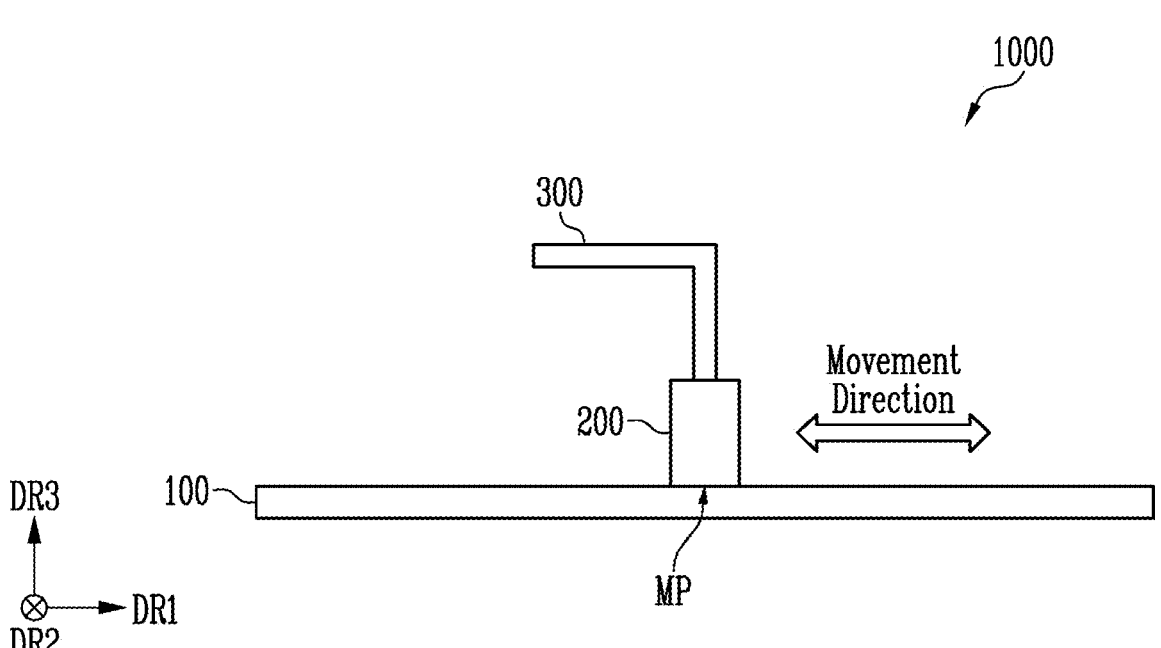
FIG. 3 is a schematic diagram illustrating the relationship between a viewing angle meter and a display device according to an embodiment of the disclosure.
Figure 4:
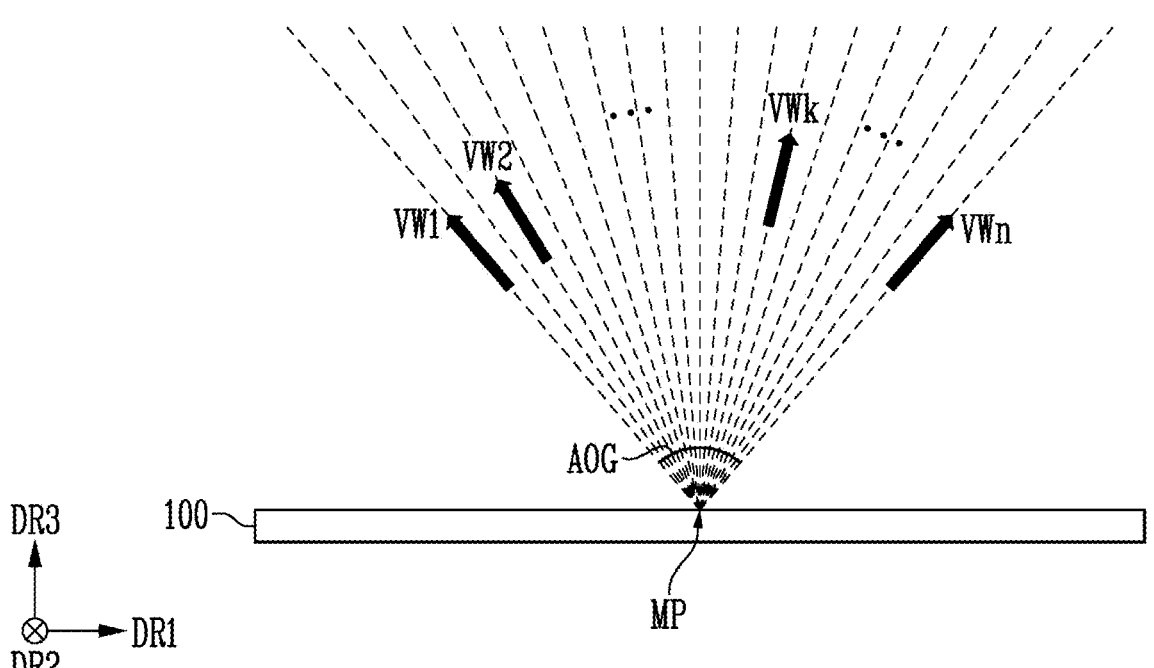
FIG. 4 is a schematic diagram illustrating an embodiment of the display device that outputs a multi-view image at a measuring point.

FIG. 3 is a schematic diagram illustrating the relationship between a viewing angle meter and a display device according to an embodiment of the disclosure. FIG. 4 is a schematic diagram illustrating an embodiment of the display device that outputs a multi-view image at a measuring point.

Referring to FIG. 3, a system 1000 for evaluating a display device according to an embodiment of the disclosure may include the display device 100, a viewing angle meter 200, and a moving member 300.

Referring to FIG. 4, the display device 100 may output multi-view images in a direction. For example, the display device 100 may output multi-view images generally in the third direction DR3 through an upper surface of the display device 100.

The display device 100 may output multi-view images through each of multiple points on the upper surface of the display device 100. For example, the display device 100 may output multi-view images for multiple viewpoints VW1, VW2, . . . VWk, . . . and VWn at a measuring point MP, where k and n may be natural numbers greater than 1, and n>k. FIG. 4 schematically shows an embodiment that a multi-view image is output at the measuring point MP, but the disclosure is not limited thereto.

The display device 100 may output a multi-view image having a maximum viewing angle AOG at the measuring point MP. For example, based on the measuring point MP, the maximum viewing angle AOG may be an angle between a first viewpoint VW1 and the last viewpoint VWn among the viewpoints VW1 to VWn implemented in the display device 100. The viewpoints VW1 to VWn may correspond one-to-one with the viewpoint areas V1 to V39 described with reference to FIG. 2.

The display panel DP (see FIG. 2) may include sub-pixel groups expressing multi-view images for the viewpoints VW1 to VWn. For example, among the sub-pixels SPX of the display panel DP, sub-pixels SPX overlapping a first viewpoint area V1 (see FIG. 2) in the third direction DR3 may be a first sub-pixel group, and the first sub-pixel group may output an image corresponding to the first viewpoint VW1. Also, among the sub-pixels SPX, sub-pixels SPX overlapping a 39th viewpoint area V39 (see FIG. 2) in the third direction DR3 may be a 39th sub-pixel group, and the 39th sub-pixel group may output an image corresponding to a 39th viewpoint. According to an embodiment, n may be 39, and the display device 100 may include at least 39 sub-pixel groups. Accordingly, at a position corresponding to each of the viewpoints VW1 to VWn, the user of the display device 10 may visually recognize an image implemented by sub-pixels corresponding to each of the viewpoint areas V1 to V39.

The viewing angle meter 200 may be disposed on the display device 100. For example, the viewing angle meter 200 may be disposed on the upper surface of the display device 100 where the multi-view image is output.

The viewing angle meter 200 may capture the multi-view image output from the display device 100. For example, the viewing angle meter 200 may include a lens. The lens included in the viewing angle meter 200 may refract light of the multi-view image emitted from the measuring point MP to travel straight, and a camera 210 (see FIG. 5) may capture the light that is refracted by the lens and travels straight. Accordingly, the viewing angle meter 200 may capture the images for the viewpoints VW1 to VWn at the measuring point MP.

The moving member 300 may move the position of the viewing angle meter 200. For example, the viewing angle meter 200 may be moved in the first direction DR1 and/or the second direction DR2 by the moving member 300. Accordingly, the viewing angle meter 200 may capture the images for the viewpoints VW1 to VWn output from each of the points on the upper surface of the display device 100.

Figure 5:
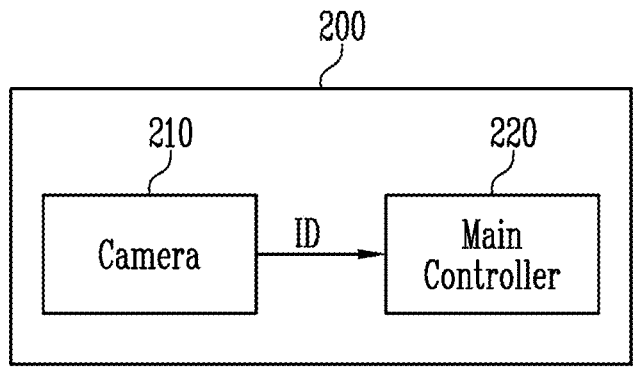
FIG. 5 is a schematic block diagram illustrating an embodiment of the viewing angle meter of FIG. 3.
Figure 6:
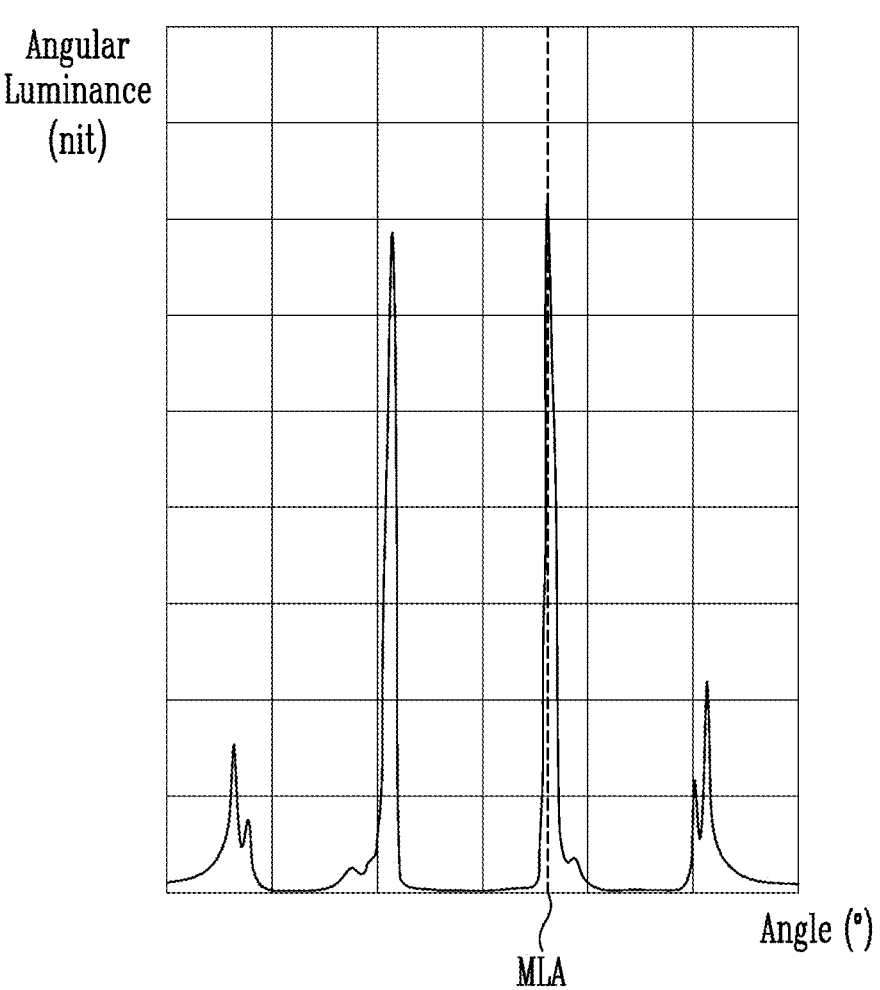
FIG. 6 is a graph showing a viewing angle profile generated by a main controller of FIG. 5.

FIG. 5 is a schematic block diagram illustrating an embodiment of the viewing angle meter of FIG. 3. FIG. 6 is a graph showing a viewing angle profile generated by a main controller of FIG. 5.

Referring to FIG. 5, the viewing angle meter 200 may include a camera 210 and a main controller 220.

The camera 210 may capture an image from the display device 100. For example, the camera 210 may capture an image from multiple measuring points included in the upper surface of the display device 100.

The camera 210 may be any one of a variety of cameras, including a charge-coupled device (CCD) camera. However, the camera 210 is not limited thereto as long as it can generate image data ID by capturing images output by the display device 100.

Referring to FIGS. 5 and 6, the main controller 220 may generate a viewing angle profile of the images corresponding to each of the viewpoints VW1 to VWn output by the display device 100. For example, the camera 210 may transmit the image data ID captured at the measuring point MP to the main controller 220. The main controller 220 may generate the viewing angle profile based on the received image data ID. For example, the main controller 220 may receive the image data ID corresponding to a k-th viewpoint VWk, and generate the viewing angle profile of the image corresponding to the k-th viewpoint VWk (hereinafter referred to as a k-th viewpoint viewing angle profile).

The main controller 220 may extract a main viewing angle VA of each of the images corresponding to the viewpoints VW1 to VWn. For example, the main controller 220 may identify an angle with the highest luminance in the k-th viewpoint VWk viewing angle profile. The main controller 220 may determine a maximum luminance angle MLA of the image corresponding to the k-th viewpoint VWk. Accordingly, the main controller 220 may extract the determined maximum luminance angle MLA as the main viewing angle VA of the image corresponding to the k-th viewpoint VWk.

Figure 7:
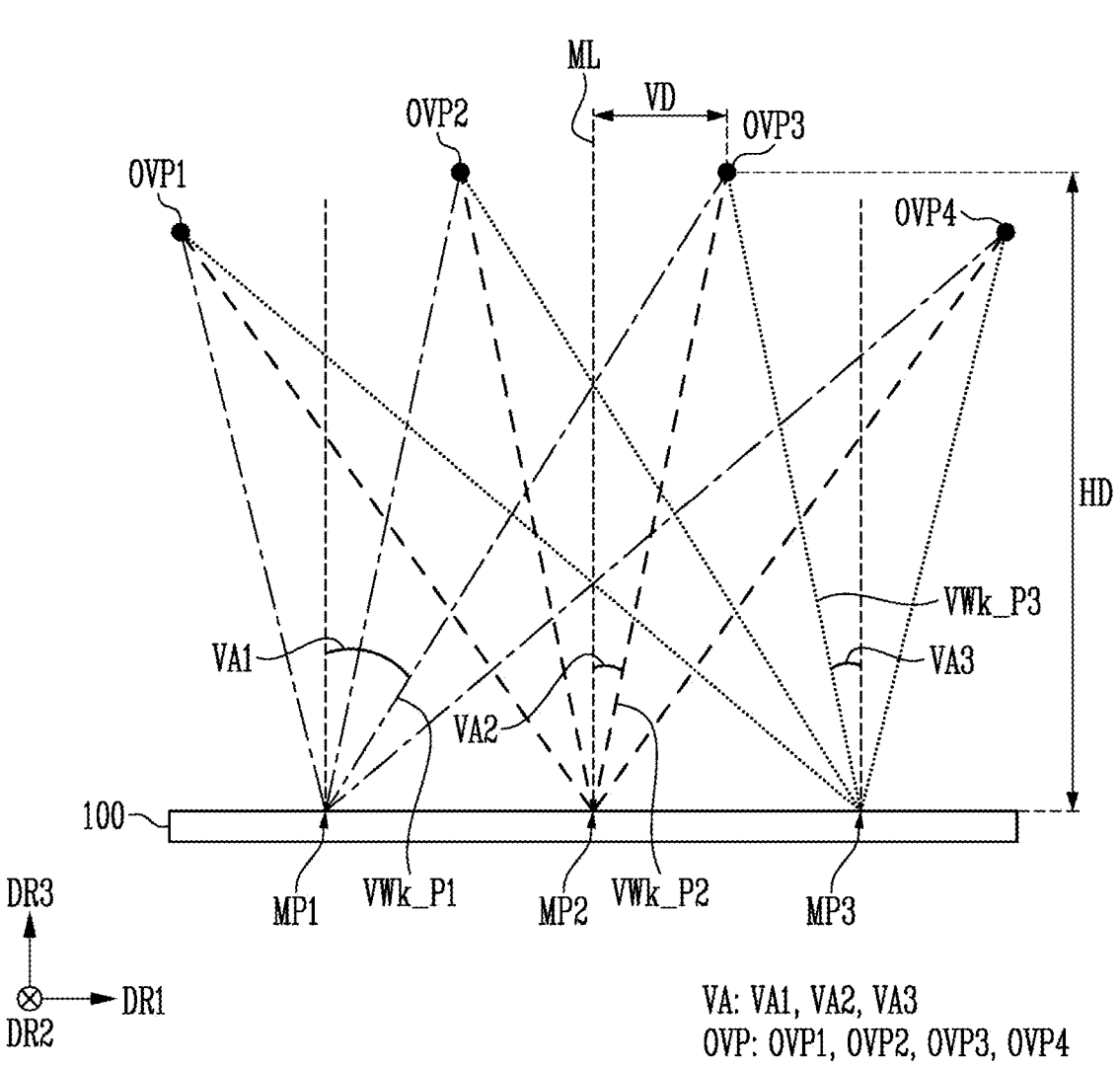
FIG. 7 is a schematic diagram schematically illustrating multi-view images output by the display device of FIG. 4 at first to third measuring points.

FIG. 7 is a schematic diagram schematically illustrating multi-view images output by the display device of FIG. 4 at first to third measuring points.

Referring to FIG. 7, the display device 100 may include first to third measuring points MP1 to MP3 that output images. For example, the display device 100 may output images for the viewpoints VW1 to VWn at the first to third measuring points MP1 to MP3 arranged in the first direction DR1. In FIG. 7, among the images output by the display device 100, images VWk_P1 to VWk_P3 for the k-th viewpoint VWk are explained, and images for other viewpoints VW1 to WWn may also be explained similarly.

The viewing angle meter 200 (see FIG. 3) may extract the main viewing angle VA of the images VWk_P1 to VWk_P3 corresponding to the k-th viewpoint VWk output from the first to third measuring points MP1 to MP3. For example, as described above with reference to FIG. 6, the viewing angle meter 200 may generate the viewing angle profile of an image VWk_P1 corresponding to the k-th viewpoint VWk output from the first measuring point MP1, and based on this, extract a first main viewing angle VA1 of the image corresponding to the k-th viewpoint VWk.

The viewing angle meter 200 may extract second and third main viewing angles VA2 and VA3 of the images VWk_P2 and VWk_P3 corresponding to the k-th viewpoint VWk output from the second and third measuring points MP2 and MP3 in the same manner.

The multi-view image displayed by the display device 100 may have an optimal viewing distance corresponding to the k-th viewpoint VWk. In case that the distance between the user and the display device 100 is different from the optimal viewing distance of the image corresponding to the k-th viewpoint VWk, distortion may occur in the image and the visibility of the display device 100 may be reduced. Accordingly, it may be necessary to accurately measure the optimal viewing distance of the multi-view image output by the display device 100.

According to an embodiment of the disclosure, the viewing angle meter 200 may determine an optimal viewing coordinates OVP of the viewpoints VW1 to VWn. For example, the viewing angle meter 200 may determine a point where virtual lines extending along the main viewing angles VA1 to VA3 of the k-th viewpoint VWk extracted from the first to third measuring points MP1 to MP3 meet as the optimal viewing coordinates OVP3. FIG. 7 shows an embodiment that there are three measuring points, but the disclosure is not limited thereto.

The viewing angle meter 200 may determine a horizontal distance VD between the optimal viewing coordinates OVP and a virtual line passing through a point of the display device 100 (for example, a center line ML passing through the center). For example, the viewing angle meter 200 may determine the horizontal distance VD between the optimal viewing coordinates OVP3 of the k-th viewpoint VWk and the center line ML spaced apart in the first direction DR1. The viewing angle meter 200 may determine a vertical distance HD between the optimal viewing coordinates OVP and the display device 100. For example, the viewing angle meter 200 may determine the vertical distance HD between the optimal viewing coordinates OVP3 of the k-th viewpoint VWk and the display device 100 spaced apart in the second direction DR2. Accordingly, the system 1000 for evaluating a display device may evaluate the display device 100 by quantifying the optimal viewing coordinates OVP of the viewpoints VW1 to VWn.

Figure 8:
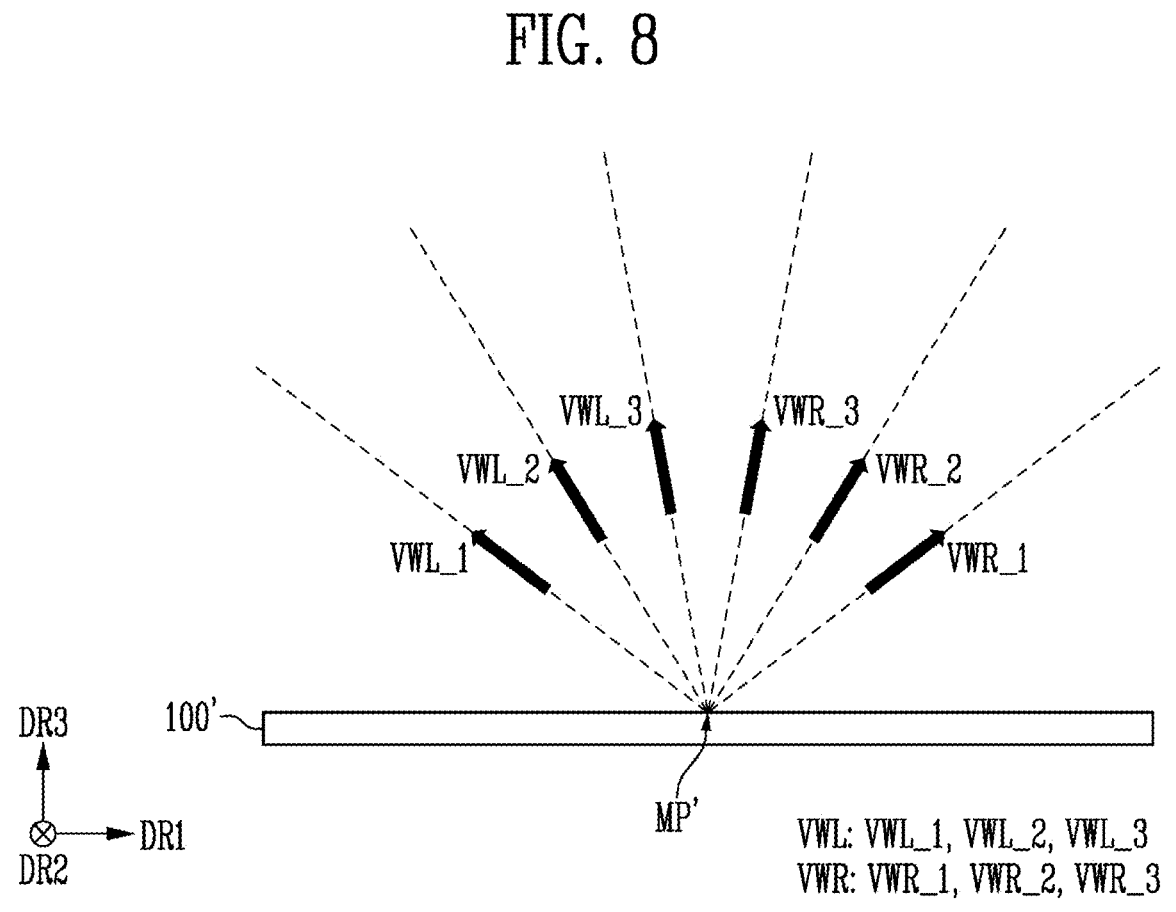
Figure 9:
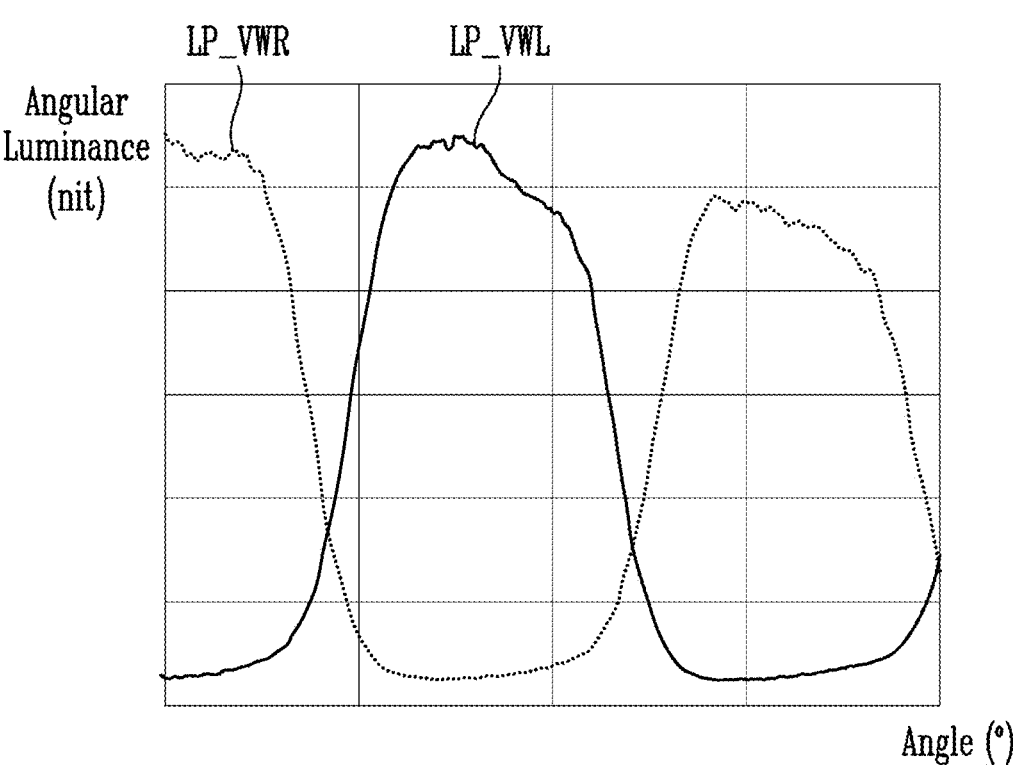
FIG. 9 is a graph showing a luminance profile generated by the viewing angle meter according to an embodiment of the disclosure.
Figure 10:
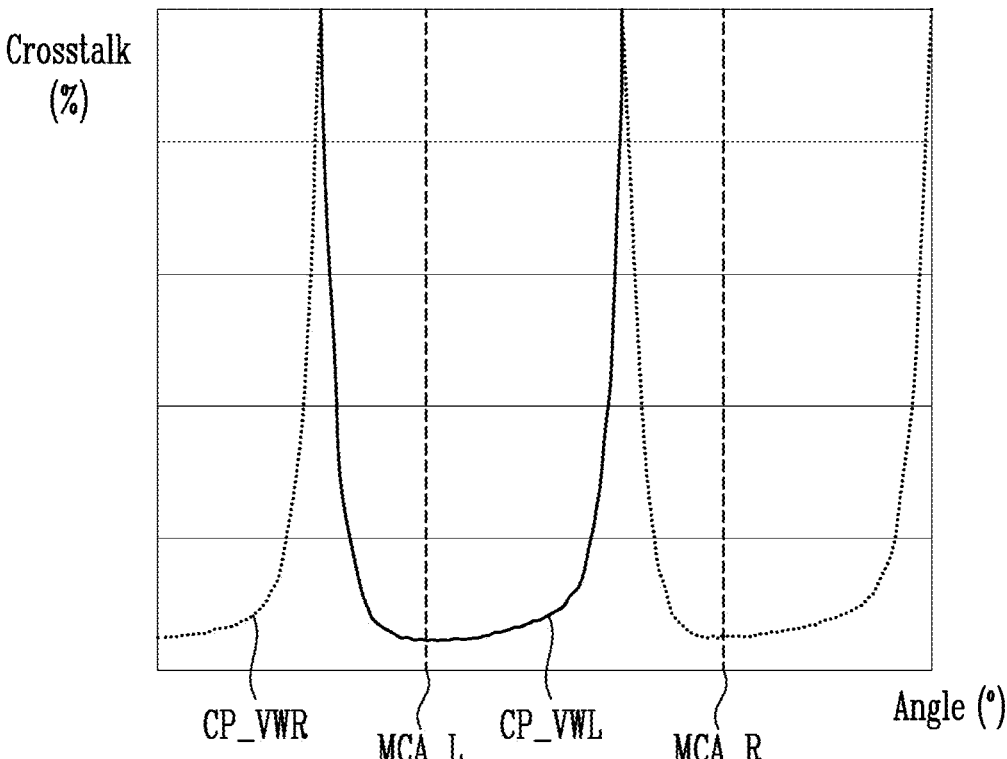
FIG. 10 is a graph showing a crosstalk profile generated by the viewing angle meter according to an embodiment of the disclosure of FIG. 9 based on the luminance profile.
Figure 11:
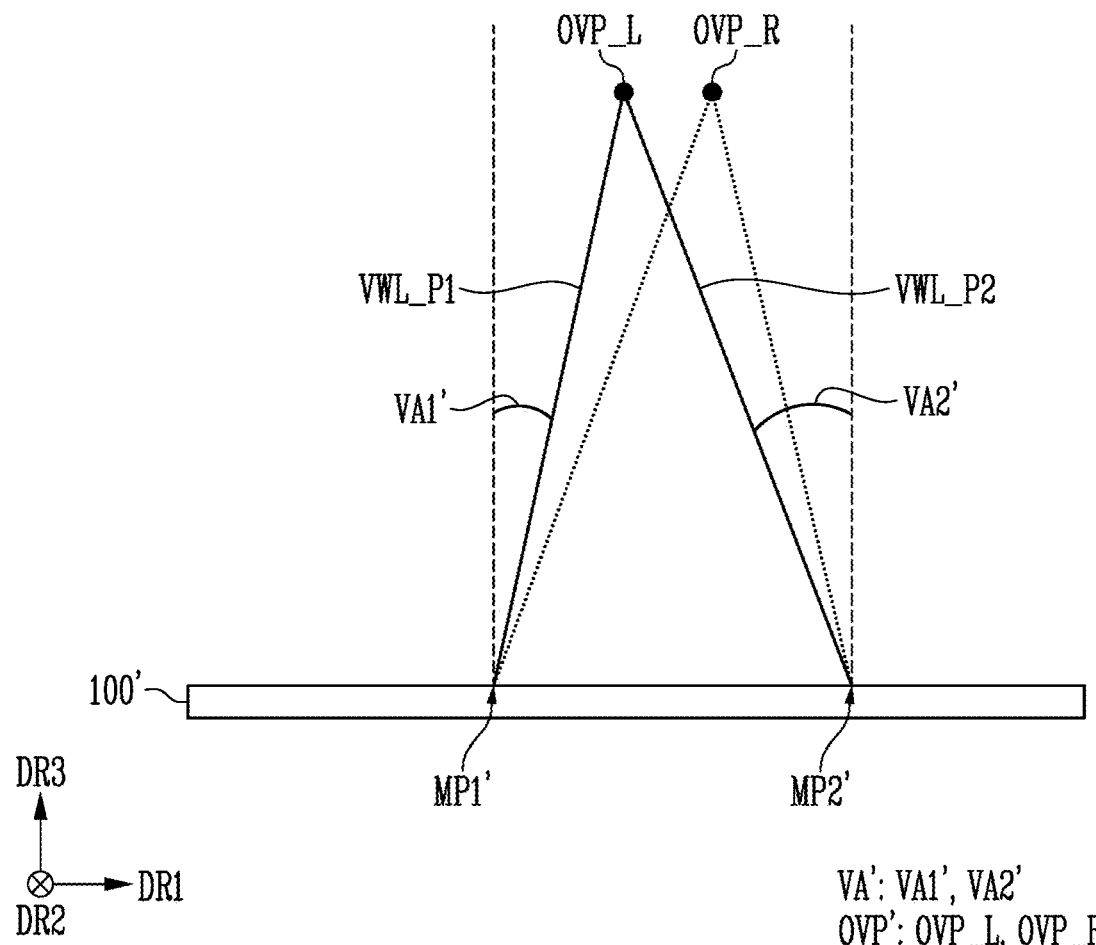
FIG. 11 is a schematic diagram schematically illustrating multi-view images output by the display device of FIG. 8 at a first measuring point and a second measuring point.

FIG. 8 is a schematic diagram illustrating an embodiment of the display device that outputs a multi-view image at a measuring point. FIG. 9 is a graph showing a luminance profile generated by the viewing angle meter according to an embodiment of the disclosure. FIG. 10 is a graph showing a crosstalk profile generated by the viewing angle meter according to an embodiment of the disclosure of FIG. 9 based on the luminance profile. FIG. 11 is a schematic diagram schematically illustrating multi-view images output by the display device of FIG. 8 at a first measuring point and a second measuring point.

A display device 100' of FIG. 8 may be described similarly to the display device 100 of FIG. 3, and overlapping descriptions will be omitted below.

Referring to FIG. 8, the display device 100' may output multi-view images through each of multiple points on an upper surface of the display device 100'. For example, the display device 100' may output images corresponding to a first viewpoint group VWL and a second viewpoint group VWR at a measuring point MP'. FIG. 8 shows an embodiment that an image is output at the measuring point MP', but the disclosure is not limited thereto.

The first viewpoint group VWL may include first to third left eye viewpoints VWL_1 to VWL_3. The second viewpoint group VWR may include first to third right eye viewpoints VWR_1 to VWR_3.

Images corresponding to the first viewpoint group VWL may be visually recognized by the left eye of a user of the display device 100'. Images corresponding to the first to third left eye viewpoints VWL_1 to VWL_3 may be substantially the same image.

Images corresponding to the second viewpoint group VWR may be visually recognized by the right eye of the user of the display device 100'. Images corresponding to the first to third right eye viewpoints VWR_1 to VWR_3 may be substantially the same image.

According to an embodiment of the disclosure, even in case that the user's position changes slightly, a stereoscopic image visually recognized by the user may not be distorted. For example, an image corresponding to the first left eye viewpoint VWL_1 may be visually recognized by the left eye of the user. Even in case that the user's position moves and an image corresponding to the second left eye viewpoint VWL_2 is visually recognized by the left eye of the user, the user of the display device 100' may visually recognize substantially the same image. Accordingly, the quality of the multi-view image output by the display device 100' may be improved.

Referring to FIGS. 5 and 8 to 10 together, the viewing angle meter 200 may measure crosstalk occurring in the images corresponding to the first viewpoint group VWL and the images corresponding to the second viewpoint group VWR. For example, the viewing angle meter 200 may generate luminance profiles of the first viewpoint group VWL and the second viewpoint group VWR based on image data ID obtained by capturing the measuring point MP' through the camera 210. For example, the viewing angle meter 200 may generate a luminance profile including the luminance LP_VWL of the first viewpoint group and the luminance LP_VWR of the second viewpoint group. The viewing angle meter 200 may measure the crosstalk of the first viewpoint group VWL and the second viewpoint group VWR based on the generated luminance profile to generate a crosstalk profile. The viewing angle meter 200 may measure the crosstalk based on a ratio of the luminance LP_VWL of the first viewpoint group and the luminance LP_VWR of the second viewpoint group. For example, the viewing angle meter 200 may measure a value obtained by dividing the luminance LP_VWR of the second viewpoint group by the luminance LP_VWL of the first viewpoint group as a crosstalk CP_VWL of the first viewpoint group. Also, the viewing angle meter 200 may measure a crosstalk CP_VWR of the second viewpoint group in substantially the same manner and may generate the crosstalk profile including the crosstalk CP_VWL of the first viewpoint group and the crosstalk CP_VWR of the second viewpoint group.

According to an embodiment of the disclosure, the viewing angle meter 200 may extract a main viewing angle VA' of each of the images corresponding to the first viewpoint group VWL and the second viewpoint group VWR. For example, the viewing angle meter 200 may determine angles MCA at which the crosstalk CP_VWL of the first viewpoint group and the crosstalk CP_VWR of the second viewpoint group are the smallest, respectively. The crosstalk CP_VWL of the first viewpoint group VWL may decrease as the luminance LP_VWR of the second viewpoint group decreases, and may decrease as the luminance LP_VWL of the first viewpoint group increases. Accordingly, the viewing angle meter 200 may determine an angle MCA_L at which the crosstalk CP_VWL of the first viewpoint group is the smallest and extract this as the main viewing angle VA'.

Referring to FIG. 11, the display device 100' may include first and second measuring points MP1' and MP2' that output images. For example, the display device 100 may output images for the first and second viewpoint groups VWL and VWR at the first and second measuring points MP1' and MP2' arranged in the first direction DR1, respectively. In FIG. 11, among the images output by the display device 100', images for the first viewpoint group VWL are explained, and images for the second viewpoint group VWR may also be explained similarly.

The viewing angle meter 200 may extract the main viewing angle VA' of the images corresponding to the first viewpoint group VWL output from the first measuring point MP1' and the second measuring point MP2'. For example, as described above, the viewing angle meter 200 may extract main viewing angles VA' and VA2' of images VWL_P1 and VWL_P2 output from the first measuring point MP1'.

According to an embodiment of the disclosure, the viewing angle meter 200 may determine an optimal viewing coordinates OVP' of the first viewpoint group VWL. For example, the viewing angle meter 200 may determine a point where virtual lines extending along the main viewing angles VA1' and VA2' of the first viewpoint group VWL extracted from the first and second measuring points MP1' and MP2' meet as the optimal viewing coordinates OVP_L. FIG. 11 shows an embodiment that there are two measuring points, but the disclosure is not limited thereto.

Figure 12:
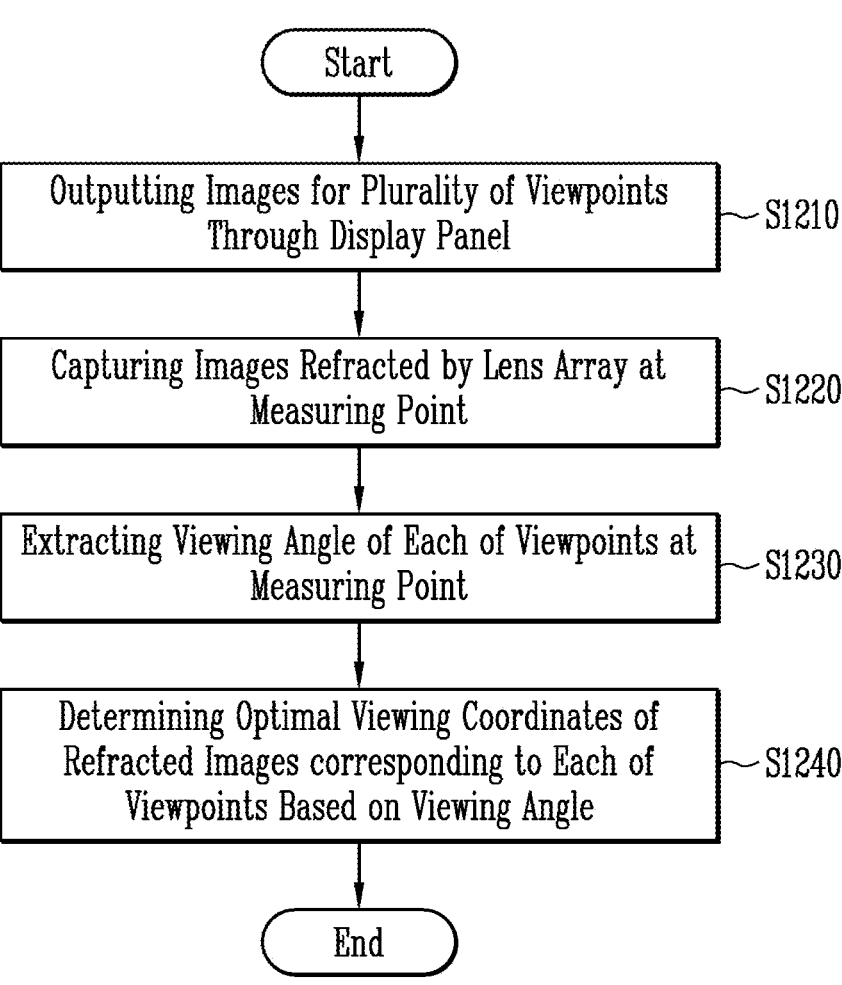
FIG. 12 is a flowchart illustrating a method for evaluating a display device according to an embodiment of the disclosure.

FIG. 12 is a flowchart illustrating a method for evaluating a display device according to an embodiment of the disclosure.

Referring to FIG. 12, a method of evaluating a display device according to an embodiment may include outputting images for multiple viewpoints through a display panel (S1210), capturing images refracted by a lens array at a measuring point (S1220), extracting a viewing angle of each of the viewpoints at the measuring point (S1230), and determining an optimal viewing coordinates of refracted images corresponding to each of the viewpoints based on the viewing angle (S1240).

Referring to FIGS. 4 and 12, in the operation S1210, images for the viewpoints VW1 to VWn may be output. For example, each of the sub-pixel groups of the display panel DP may output corresponding images of the viewpoints VW1 to VWn.

Referring to FIGS. 3 and 12, in the operation S1220, images refracted by the lens array LSA (see FIG. 1) may be captured at the measuring point MP. For example, the viewing angle meter 200 may capture multi-view images output from the measuring point MP of the display device 100.

In this operation, the viewing angle meter 200 may capture multi-view images output from each of the measuring points of the display device 100. For example, the viewing angle meter 200 may be moved in a horizontal direction (for example, the first direction DR1 or the second direction DR2) by the moving member 300. Accordingly, the viewing angle meter 200 may capture multi-view images output from measuring points other than the measuring point MP of the display device 100.

Referring to FIGS. 4, 6, and 12, in the operation S1230, the main viewing angle VA of each of the viewpoints VW1 to VWn at the measuring point MP may be extracted. For example, the viewing angle meter 200 may generate the viewing angle profile of the k-th viewpoint VWk, which is one of the viewpoints VW1 to VWn at the measuring point MP. Accordingly, the viewing angle meter 200 may determine the maximum luminance angle MLA of the image corresponding to the k-th viewpoint VWk based on the viewing angle profile, and extract the maximum luminance angle MLA as the main viewing angle VA of the k-th viewpoint VWk.

Referring to FIGS. 4, 7, and 12, in the operation S1240, the optimal viewing coordinates OVP of the images corresponding to each of the viewpoints VW1 to VWn may be determined based on the main viewing angle VA. For example, the viewing angle meter 200 may determine a point where virtual lines extending along main viewing angles VA of the k-th viewpoint VWk output from the first to third measuring points MP1 to MP3 meet as the optimal viewing coordinates OVP3. Thereafter, the viewing angle meter 200 may determine the optimal viewing coordinates OVP of the images corresponding to viewpoints VW other than the k-th viewpoint VWk.

Figure 13:
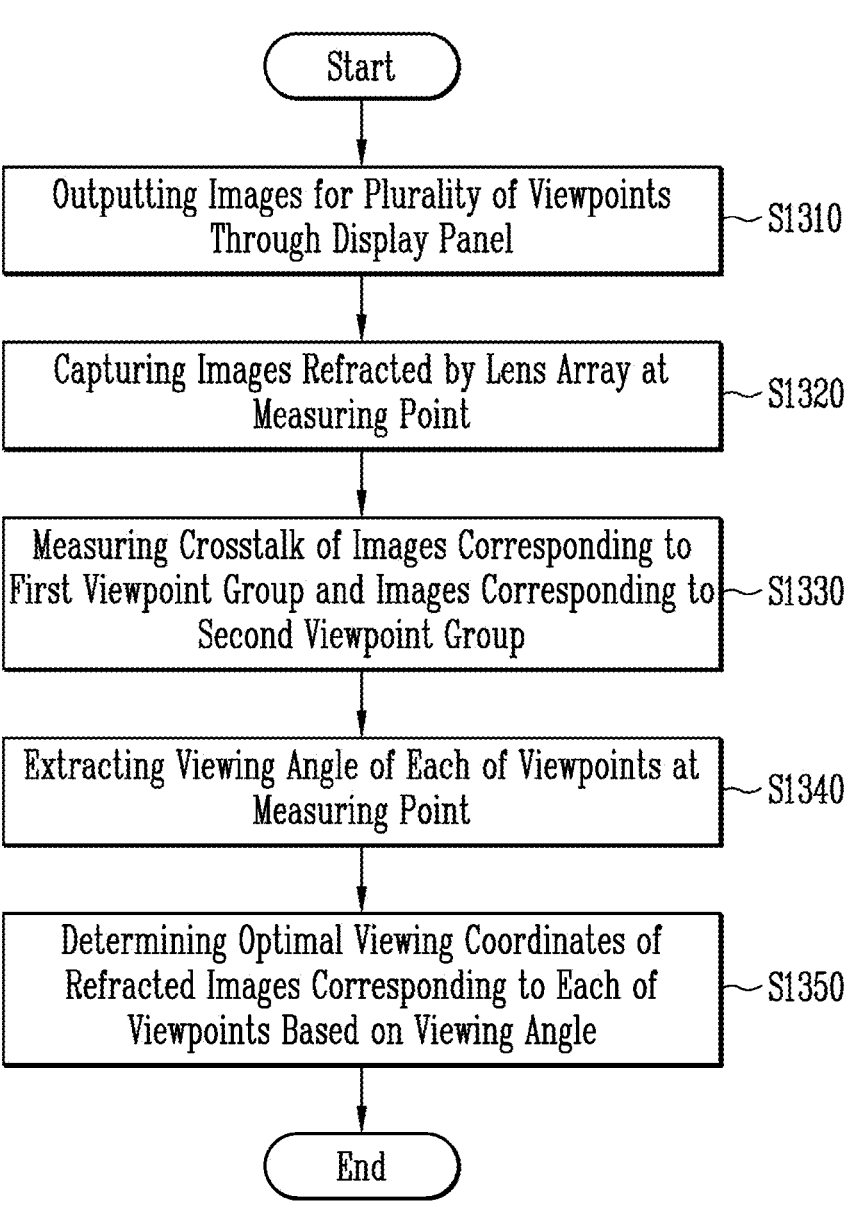
FIG. 13 is a flowchart illustrating a method for evaluating a display device according to an embodiment of the disclosure.

FIG. 13 is a flowchart illustrating a method for evaluating a display device according to an embodiment of the disclosure.

Referring to FIG. 13, a method of evaluating a display device according to an embodiment may include outputting images for multiple viewpoints through a display panel (S1310), capturing images refracted by a lens array at a measuring point (S1320), measuring crosstalk of images corresponding to a first viewpoint group and images corresponding to a second viewpoint group (S1330), extracting a viewing angle of each of the viewpoints at the measuring point (S1340), and determining an optimal viewing coordinates of refracted images corresponding to each of the viewpoints based on the viewing angle (S1350).

The operations S1310 and S1320 of FIG. 13 may be similar to the operations S1210 and S1220 of FIG. 12, and overlapping descriptions will be omitted below.

Referring to FIGS. 8 to 11 and 13, in the operation S1330, crosstalk of images corresponding to the first viewpoint group VWL and images corresponding to the second viewpoint group VWR may be measured. For example, the viewing angle meter 200 may generate a luminance profile of the first viewpoint group VWL and a luminance profile of the second viewpoint group VWR. The viewing angle meter 200 may generate a crosstalk profile based on the generated luminance profile. The images corresponding to the first viewpoint group VWL may be visually recognized by the left eye of the user of the display device 100', and the images corresponding to the second viewpoint group VWR may be visually recognized by the right eye of the user of the display device 100'.

Referring to FIGS. 8 to 11 and 13, in the operation S1340, the main viewing angle VA of each of the first and second viewpoint groups VWL and VWR at the measuring point MP' may be extracted. For example, the viewing angle meter 200 may determine the angle MCA_L at which the crosstalk CP_VWL of the first viewpoint group VWL is the smallest at the measuring point MP'. The viewing angle meter 200 may extract the angle MCA_L at which the crosstalk CP_VWL of the first viewpoint group VWL is the smallest as the main viewing angle VA' of the first viewpoint group VWL.

Referring to FIGS. 8 to 11 and 13, in the operation S1350, the optimal viewing coordinates OVP' of images corresponding to each of the first and second viewpoint groups VWL and VWR may be determined based on the main viewing angle VA'. For example, the viewing angle meter 200 may determine a point where virtual lines extending along the main viewing angles VA1' and VA2' of the first viewpoint group VWL at the first measuring point MP1' and the second measuring point MP2' overlap each other as the optimal viewing coordinates OVP_L of the image corresponding to the first viewpoint group VWL.

According to an embodiment of the disclosure, the viewing angle meter 200 may determine the optimal viewing coordinates OVP' of each of the images visually recognized by the left and right eyes of the user of the display device 100'. Accordingly, the system 1000 for evaluating a display device may evaluate the display device 100' that outputs a multi-view image with improved reliability.

The system and method for evaluating a display device according to the disclosure may evaluate the display device that outputs images corresponding to multiple viewpoints with improved reliability.

The above description is an example of technical features of the disclosure, and those skilled in the art to which the disclosure pertains will be able to make various modifications and variations. Therefore, the embodiments of the disclosure described above may be implemented separately or in combination with each other.

Therefore, the embodiments disclosed in the disclosure are not intended to limit the technical spirit of the disclosure, but to describe the technical spirit of the disclosure, and the scope of the technical spirit of the disclosure is not limited by these embodiments. The protection scope of the disclosure should be interpreted by the following claims, and it should be interpreted that all technical spirits within the equivalent scope are included in the scope of the disclosure.

What is claimed is:

1. A system for evaluating a display device comprising:
the display device including a display panel outputting images for a plurality of viewpoints and a lens array refracting the images; and
a viewing angle meter disposed on a measuring point of the display device and extracting a viewing angle for each of the plurality of viewpoints,
wherein the viewing angle meter determines an optimal viewing coordinates of refracted images corresponding to each of the plurality of viewpoints based on the viewing angle, wherein the measuring point includes a first measuring point and a second measuring point arranged in a first direction, and
wherein the viewing angle meter determines a point where virtual lines extending along viewing angles of a corresponding one of the plurality of viewpoints extracted from the first and second measuring points meet as the optimal viewing coordinates.

2. The system of claim 1, wherein the viewing angle meter determines a distance between a virtual line passing through a point of the display device and the optimal viewing coordinates in the first direction.

3. The system of claim 1, wherein the viewing angle meter determines a distance between the measuring point and the optimal viewing coordinates in a second direction intersecting the first direction.

4. The system of claim 1, wherein the viewing angle meter generates a viewing angle profile for each of the plurality of viewpoints at the measuring point, and extracts a maximum luminance angle of the viewing angle profile as a main viewing angle for each of the plurality of viewpoints.

5. The system of claim 1, further comprising:
a moving member moving the viewing angle meter in a direction parallel to a plane in which the display device extends.

6. The system of claim 1, wherein
the plurality of viewpoints include a first viewpoint group and a second viewpoint group,
among the refracted images, images corresponding to the first viewpoint group are visually recognized by a left eye of a user of the display device, and
images corresponding to the second viewpoint group are visually recognized by a right eye of the user.

7. The system of claim 6, wherein the viewing angle meter measures crosstalk of the images corresponding to the first viewpoint group and the images corresponding to the second viewpoint group.

8. The system of claim 7, wherein the viewing angle meter generates luminance profiles of the first viewpoint group and the second viewpoint group, and measures the crosstalk based on a ratio of luminance of the first viewpoint group and luminance of the second viewpoint group.

9. The system of claim 8, wherein the crosstalk of the images corresponding to the first viewpoint group decreases as the luminance of the second viewpoint group decreases.

10. A method for evaluating a display device including a display panel outputting images for a plurality of viewpoints and a lens array refracting the images, comprising:
outputting the images through the display panel;
capturing the images refracted by the lens array at a measuring point;
extracting a viewing angle for each of the plurality of viewpoints at the measuring point; and
determining an optimal viewing coordinates of refracted images corresponding to each of the plurality of viewpoints based on the viewing angle, wherein:
the measuring point includes a first measuring point and a second measuring point arranged in a first direction, and
a point where virtual lines extending along viewing angles of a corresponding one of the plurality of viewpoints extracted from the first and second measuring points meet is determined as the optimal viewing coordinates.

11. The method of claim 10, wherein the optimal viewing coordinates are determined based on a distance between a virtual line passing through a point of the display device and the optimal viewing coordinates in the first direction.

12. The method of claim 10, wherein the optimal viewing coordinates are determined based on a distance between the display device and the optimal viewing coordinates in a second direction intersecting the first direction.

13. The method of claim 10, wherein the extracting of the viewing angle for each of the plurality of viewpoints at the measuring point includes:

generating a viewing angle profile for each of the plurality of viewpoints at the measuring point; and extracting a maximum luminance angle of the viewing angle profile as a main viewing angle for each of the plurality of viewpoints.

14. The method of claim 10, wherein the plurality of viewpoints include a first viewpoint group and a second viewpoint group, among the refracted images, images corresponding to the first viewpoint group are visually recognized by a left eye of a user of the display device, and images corresponding to the second viewpoint group are visually recognized by a right eye of the user.

15. The method of claim 14, further comprising:

measuring crosstalk of the images corresponding to the first viewpoint group and the images corresponding to the second viewpoint group.

16. The method of claim 15, wherein the measuring of the crosstalk of the images includes:

generating luminance profiles of the first viewpoint group and the second viewpoint group; and measuring the crosstalk based on a ratio of luminance of the first viewpoint group and luminance of the second viewpoint group.

17. The method of claim 16, wherein the crosstalk of the images corresponding to the first viewpoint group decreases as the luminance of the second viewpoint group decreases.

18. An electronic device comprising:

a processor;

a display device including a display panel, the display device configured to display images for a plurality of viewpoints on the display panel under control of the processor; and a lens array configured to refract the images, wherein the display device is evaluated by a method, comprising:

outputting the images through the display panel;

capturing the images refracted by the lens array at a measuring point;

extracting a viewing angle for each of the plurality of viewpoints at the measuring point; and determining an optimal viewing coordinates of refracted images corresponding to each of the plurality of viewpoints based on the viewing angle, wherein:

the measuring point includes a first measuring point and a second measuring point arranged in a first direction, and a point where virtual lines extending along viewing angles of a corresponding one of the plurality of viewpoints extracted from the first and second measuring points meet is determined as the optimal viewing coordinates.

\* \* \* \* \*